United States Patent [19]

Fleer

[11] 4,209,908

[45] Jul. 1, 1980

[54] MOBILE DENTAL UNIT

[75] Inventor: Ernst O. Fleer, Bensheim-Auerbach, Fed. Rep. of Germany

[73] Assignee: Siemens Aktiengesellschaft, Berlin & Munich, Fed. Rep. of Germany

[21] Appl. No.: 899,988

[22] Filed: Apr. 25, 1978

[30] Foreign Application Priority Data

May 3, 1977 [DE] Fed. Rep. of Germany ....... 2719715

[51] Int. Cl.[2] .................... A61C 19/02

[52] U.S. Cl. .................... 433/78

[58] Field of Search .................... 32/22

[56] References Cited

U.S. PATENT DOCUMENTS

| | | | |
|---|---|---|---|
| 2,214,775 | 9/1940 | Pieper | 32/22 |
| 3,662,465 | 5/1972 | Heubeck | 32/22 |

FOREIGN PATENT DOCUMENTS

| | | | |
|---|---|---|---|
| 2221130 | 11/1973 | Fed. Rep. of Germany | 32/22 |

*Primary Examiner*—Robert Peshock
*Attorney, Agent, or Firm*—Hill, Van Santen, Steadman, Chiara & Simpson

[57] ABSTRACT

A mobile dental unit having a housing of a tabletop height and having a width which is less than the height, the housing on a narrow side being provided with a plurality of side-by-side storage receptacles for dental handpieces, each of the dental handpieces having the supply hose extending through the receptacle to a source with take up devices for each of the supply hoses characterized by the receptacles of the handpiece being arranged in two separate rows with the first row containing primary dental handpieces and the second row containing receptacles for secondarily used handpieces, the first row of receptacles being disposed adjacent the top of the housing and the second row being disposed beneath the first row, a guide pulley for each of the receptacles of the first row being supported adjacent the receptacle and immediately below the top of the housing and the take-up devices for each of the supply hoses of the first row including means for retracting the supply hoses into the housing when the handpieces are not in use. The first row of receptacles is movable either by pivoting from a storage position to a working position or can be slid from a withdrawn storage position in the housing to an exposed working position. The second row of receptacles is mounted in the housing for pivoting between the storage and working position. In one embodiment of the invention, a coupling member is provided so that both rows pivot simultaneously between the working and storage position.

17 Claims, 9 Drawing Figures

MOBILE DENTAL UNIT

BACKGROUND OF THE INVENTION

1. Field of the Invention

The present invention is directed to a mobile dental unit, which has a housing of tabletop height with a width of less than half its height and which on a narrow side is provided with a plurality of side-by-side storage receptacles for dental handpieces which have supply hoses extending through the respective receptacle into the housing to a source of supply fluids such as air pressure, electricity and/or water.

2. Prior Art

Mobile dental units are known and an example is disclosed in British Patent No. 1,138,294. Such a mobile dental unit is especially suitable for use by a dentist who is in a sitting position and the unit can be fitted into a bay or recess provided in cabinets adjacent to a dental chair. Due to the small dimension of the housing of the unit, the unit may be moved to a position as close as possible to the patient and within reach of the dentist so that he may obtain a handpiece without requiring excessive body movement or rotation. In order to be stored in a recess or bay of a cabinet and since the dentist is utilizing the handpieces while in a sitting position, the dimensions of the housing of the unit are necessarily small. Because the length of the supply hose must be of a predetermined order to enable sufficient freedom of movement and range for the handpiece during its use, the reduced or small dimensions of the unit creates problems with the storage of the supply hoses of the handpieces which are not in use.

In the last couple of years, dentists have requested a constantly increasing variety of handpieces. At an earlier time a dentist was often satisfied with the arrangement of two or at the most three so-called primary handpieces, which are the handpieces that are used most frequently by the dentist during his work and are being constantly interchanged, for example, electromotor and/or turbine handpieces with dental drill attachments and the frequently used spray handpiece. Today, however, the dentist is faced with frequent requests for use of an arrangement of at least three primary handpieces in addition to these several so-called secondarily used handpieces, which are handpieces which the dentist uses only infrequently or only for special treatments, for example, ultrasonic tartar deposit removal handpieces, high frequency surgical handpieces, ultraviolet light handpieces, and drill handpieces with attachments that are used only infrequently. The storage of all these primary and secondary handpieces in a mobile dental unit provided with receptacles and having a small size creates problems. These problems are due to the space availability of the unit for both storing the long supply hose of each handpiece which length is required to provide the maximum range of use and for positioning each of the handpieces in a receptacle so that they can be reached without interference from closely spaced handpieces.

SUMMARY OF THE INVENTION

The present invention is directed to an improved mobile dental hand unit which provides both primarily used as well as secondarily used handpieces which are arranged in such a fashion to maximize the extension capabilities of the supply hoses and to make it possible that a handpiece may be selected and removed from the unit with the minimum interference with other handpieces.

To accomplish this goal, the present invention is directed to an improvement in a mobile dental unit comprising a housing of a tabletop height and having a width, which is less than half the height, said housing on a narrow side being provided with a plurality of side-by-side storage receptacles for dental handpieces, each of said dental handpieces having a supply hose extending through the receptacle to a source with means for taking up the supply hoses. The improvement comprises the receptacles for the handpieces being arranged in two separate rows with the first row containing primary dental handpieces and the second row containing receptacles for secondarily used handpieces, means for supporting each of the rows in the housing with the first row being disposed adjacent the top of the housing and the second row being disposed beneath the first row, said means for supporting also supporting a guide pulley for each supply hose extending through each receptacle of the first row adjacent the receptacle and immediately below the top of the housing, said means for supporting positioning the receptacles in varied relation to each other to improve accessibility to the handpiece received therein, and the means for taking up the supply hoses for the first row of receptacles including devices or means for retracting the supply hoses into the housing when the handpieces are not in use.

The means supporting each of the rows of receptacles preferably enables at least one row to be moved from a storage position to a working position. Preferably, the first row which contains the primary handpieces is either slid between the working and storage position or is pivoted on an axis between the two positions. The secondary row preferably is moved between a storage and working position by being rotated on a pivot axis. By arranging the primary handpieces of the first row immediately below the upper edge of the unit, the total height of the unit is available for handling and storing the supply hose. Thus, twice the height of the unit can be used as a maximum length for the supply hoses of the primary handpiece. Since the supply hoses of the secondary handpieces are considerablly smaller and, therefore, more flexible than the hoses of the primary handpieces, their entire height can be stored, for example, on an automatic take up reel or pulley which cannot be used with a relatively heavier and stiffer supply hoses of the primary handpiece.

DESCRIPTION OF THE PREFERRED EMBODIMENTS

Figure 2:
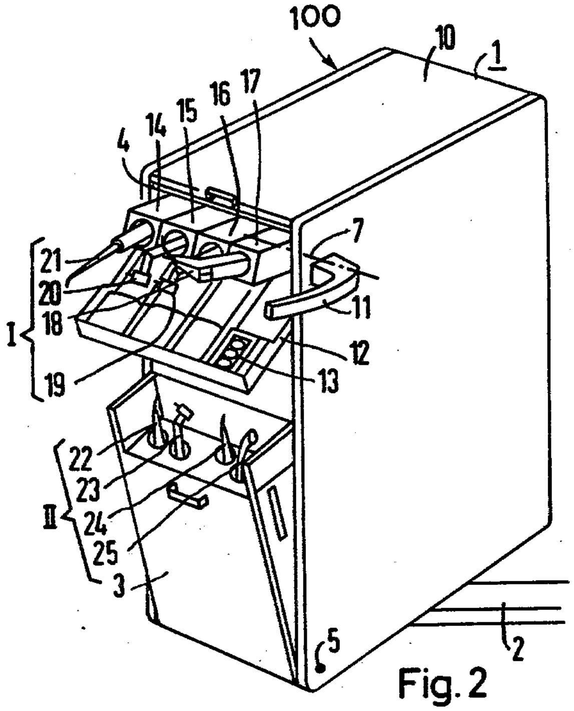
FIG. 2 is a perspective view of the dental unit of FIG. 1 with the rows of receptacles in the open or working position.
Figure 1:
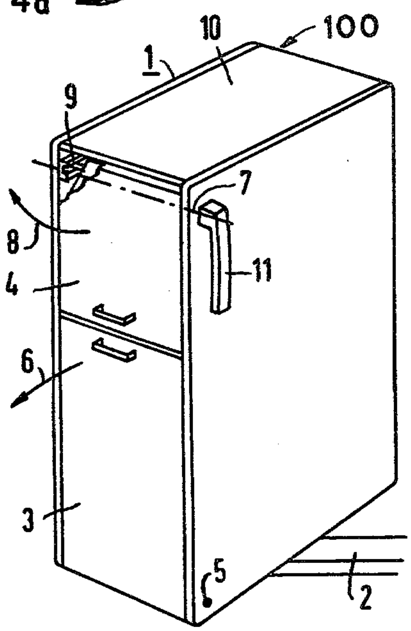
FIG. 1 is a perspective view of a dental unit in accordance with the present invention.

The principles of the present invention are particularly useful when incorporated in a mobile dental work unit generally indicated at 100 and illustrated in FIGS. 1 and 2. The unit 100 has a housing 1, which has approximately the height of a tabletop or between 70 and 90 cm and has a relatively small width of approximately 25 to 40 cm. The housing 1 is pivotably mounted on a swivel beam 2, which can be a single or multiple member device depending on the desired mobility of the unit 100 and which at its other end is mounted by a pivotable bearing arrangement either close to a patient's chair or in a recess or bay of a cabinet arrangement.

Figure 5:
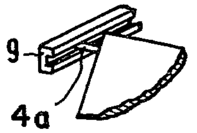
FIG. 5 is a partial broken away view illustrating the mounting of a door panel of the dental unit of FIG. 1.

The housing 1 has two large side walls and is closed along a narrow end face by a first panel 3 and a second panel 4. The housing part or panel 3, as can be seen in FIG. 2, is pivoted around a horizontal pivot axis 5 in the direction of an arrow 6. The panel or housing part 4 is a pivotable, sliding door and can be pivoted in the direction of arrow 8 (FIG. 1) on a pivot axle or bearing 4*a* (FIG. 5), which is slidably received in slide guides 9 so that after pivoting the panel 4 through 90°, to extend parallel to a top or upper panel 10, it may be slid on the guide rails 9 to a storage position parallel and adjacent to the top panel 10 of the housing 1.

Figure 4:
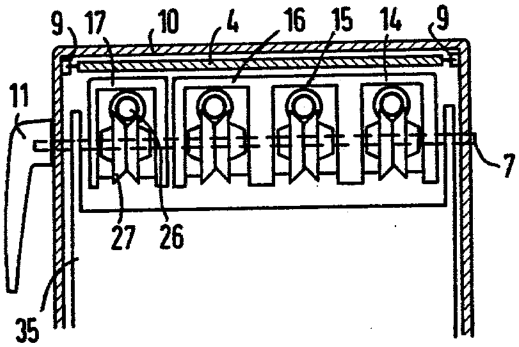
FIG. 4 is a partial cross-sectional view of the dental unit.
Figure 3:
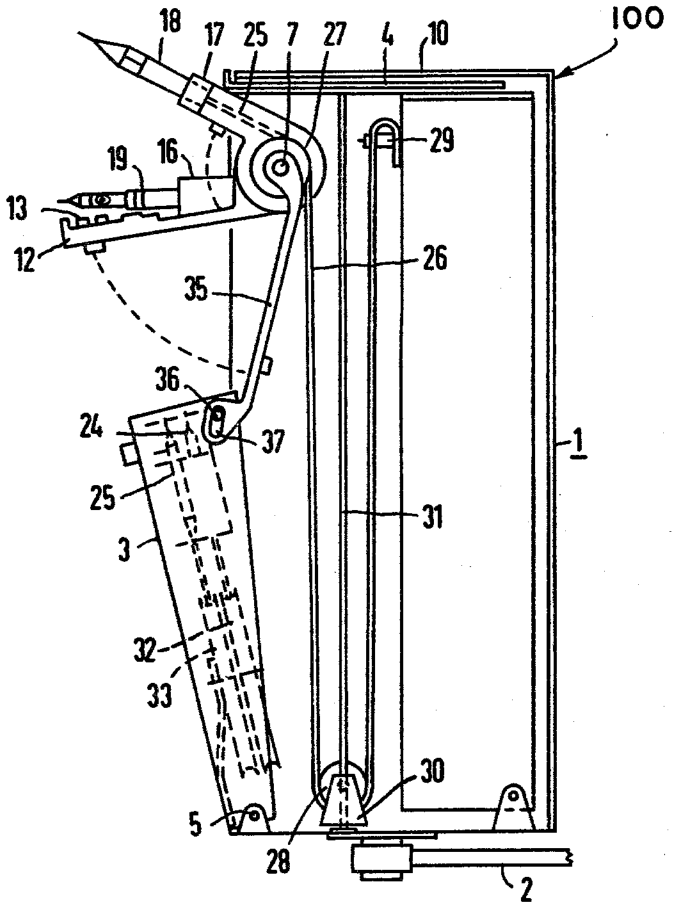
FIG. 3 is a cross-sectional view of the dental unit of FIGS. 1 and 2.
Figure 7A:
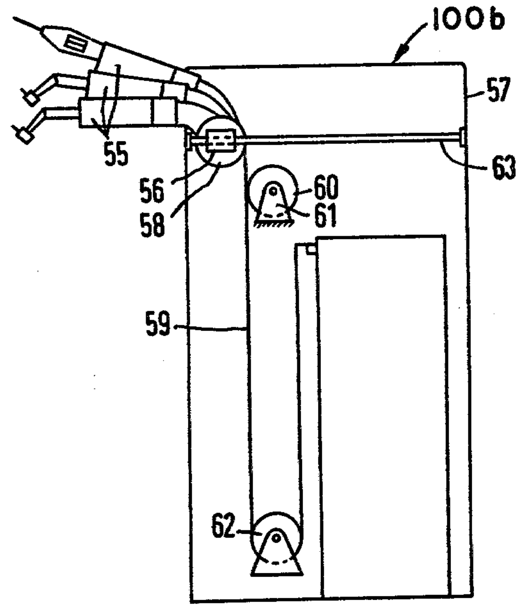
FIGS. 7*a* and 7*b* are partial cross-sectional views illustrating a third embodiment of the present invention.
Figure 7B:
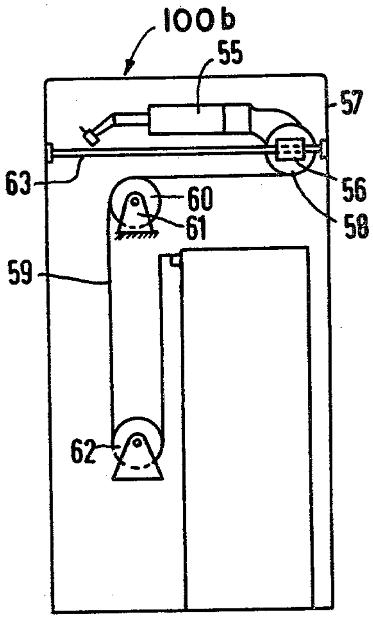

With the door or panel 4 moved to a stored position illustrated in FIGS. 2 and 3, a first row of receptacles 14, 15, 16 and 17 can be moved from a storage position to a working position by being rotated on means for supporting the receptacle, which includes an axle 7, which is rotated by a handle 11. In addition to the receptacles 14, 15, 16 and 17, a control console 12 is connected to be tilted or pivoted with the rotation on the axle 7 and a front area of the console 12 is provided with several adjusting and service pieces 13 for handpieces such as 18, 19, 20 and 21 which are received in the receptacles 17, 16, 15 and 14, respectively. As illustrated in FIGS. 3 and 4, the means for supporting which includes the axle 7 positions the receptacles 14, 15, 16 and 17 adjacent to the upper panel 10 of the housing 1.

Each of the handpieces 18–21 are primarily used handpieces and include a spray handpiece 18, and dental drill handpieces 19, 20 and 21. Since these handpieces are used by the dentist on almost every patient and the dentist frequently changes between the various handpieces, these handpieces are considered to be primary handpieces in contrast to handpieces such as 22–25, which are arranged in a second row beneath the row containing handpieces 18–21. The handpieces 22–25, which are less frequently used, are only used during specialized processes and are called secondarily used handpieces. These handpieces include a high frequency surgical handpiece 22, a dental drill handpiece 23 with a less frequently used drill bit attachment, an ultrasonic tartar deposit removal handpiece 24, and an ultraviolet light handpiece 25. Each of these handpieces 22, 23, 24 and 25 are received in receptacles, which are formed in a portion of the panel 3 in a staggered relationship as illustrated in FIGS. 2 and 3. In addition, each of the handpieces such as 24 and 25 is provided with a supply hose take up means, such as take up reel 32 and 33, respectively. It should be noted that the supply hoses for the secondarily used handpieces 22–25 are substantially smaller in diameter and more flexible than the supply hoses for the primarily used handpieces which are stored in the first row of receptacles.

The receptacles 14–17 of the upper handpiece row or the first row can be rotated around the same axis 7 which also servces to support the rotatable control console 12. The receptacle 17 (FIG. 3) as compared to the remaining receptacles 14, 15 and 16 may be rotated through a larger angle to extend upward above the other receptacles so that the spray handpiece 18 is more easily removed. The smaller amount of tilting for the remaining receptacles provides an advantage over the customary holders of the previously known dental units because immediately after removal of a handpiece from the receptacle, the handpiece is away from the danger zone of the very pointed and sharp edge tools of the remaining handpieces. This staggering of the handpieces is shown in FIG. 2 and FIG. 3 can be accomplished by using suitable engagement pieces, which are attached on the axle 7 and have suitable dogs to provide a rotary lost motion connection between the various units.

Each of the primary handpieces 18, 19, 20 and 21 is connected to a supply line or hose such as the supply hose 26, which supplies the energy and fluids such as water, air and electricity. Each of the supply hoses such as 26 is provided with a guide pulley 27 which is mounted for rotation on axle 7 and the hose passes around the pulley 27 and extends to and around an idler pulley 28 to a connection 29, which connects the hose to suitable sources for each of the fluids being conveyed therein. The idler pulley 28 is provided with a weight 30 and is guided to move in a vertical plane by the weight sliding along rod 31 to form a hose take up or tensioning device. Thus, each of the hoses of the dental handpieces in the first row of receptacles is prevented from becoming entangled with one another and is provided with a desired tension thereon. As mentioned hereinabove, the secondarily used handpieces such as 24 and 25 are provided with hose take up means which utilize take up reels.

It is desirable that the first row of receptacles 14–17 be interconnected to the second row of receptacles which are formed in the panel member 3. This is accomplished by a coupling means 35, which forms a pivoted partition that covers portions of the hoses 26 and the hose take up device. The coupling member 35, which is coupled to the panel 3 by an oblong slot 37 receiving a projection or pin 36 to form a lost motion connection therebetween. Thus, when the first row of receptacles 14–17 are rotated from the storage position to a working position as illustrated in FIG. 3, the second row of receptacles in the panel 3 are pivoted from the storage position to the working position. It should be noted that the member 35 is connected to the axle 7 with an appropriate lost motion connection to enable pivotal movement between the working position illustrated and a storage position withdrawn in the housing 1.

Figure 6:
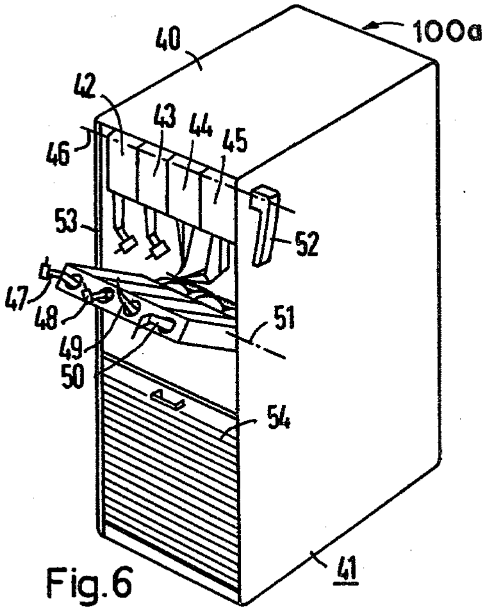
FIG. 6 is a perspective view of a second embodiment of the dental unit in accordance with the present invention.

An embodiment of the unit is generally indicated at 100*a* in FIG. 6. In this embodiment, a housing 41 has a top cover 40. A first row of storage receptacles 42, 43, 44 and 45 are mounted for rotation on an axle 46, which has an actuating handle 52 which moves the row from a storage position illustrated in FIG. 6 to an extended working position similar to that illustrated in FIG. 2. Thus each, of the handpieces hangs upside down when in the storage position. As in the previous embodiment, each of the supply hoses is guided by supply hose take up means in a manner similar to that illustrated in FIG. 3. The secondary handpieces such as 47, 48, 49 and 50 are received in receptacles, which are mounted to pivot on an axis 51 from a working position illustrated to a storage position with the free end of each of the receptacles extending downward in the vertical direction similar to the first row of receptacles 42–45. In the embodiment of FIG. 6, the guidance and fixing of the supply lines for the handpieces in a second row is accomplished by using hose reels or similar arrangements. Due to the upside down hanging of the primary handpieces while in a storage position, removal of the secondary handpieces can be accomplished without interference. In the embodiment of FIG. 6, when both the first and second rows of handpieces are in the stored position, the opening in the side of the housing 40 can be closed by a flexible panel 54, which is moved in guide rails 53 extending along the edge of the opening.

Figure 8:
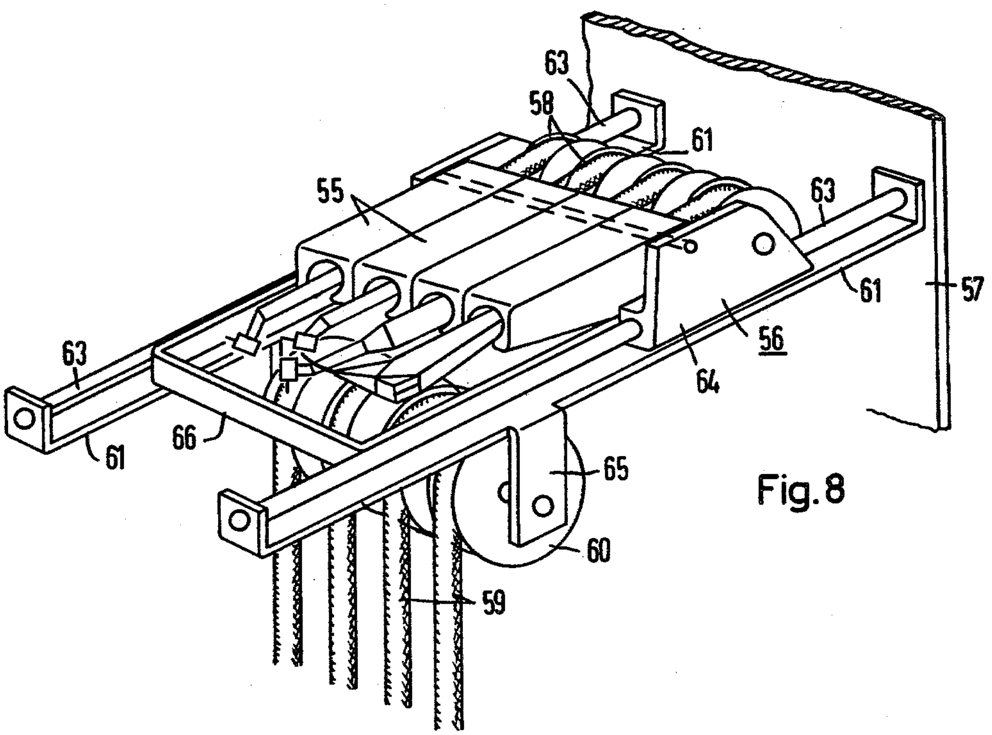
FIG. 8 is a perspective view of the supporting device for a first row of the primary dental handpieces in accordance with the embodiment of FIGS. *7a* and *7b*.

Another embodiment of a unit is generally indicated at 100*b* in FIGS. *7a* and *7b*. In this embodiment, storage receptacles 55 for the primary handpieces are guided into the housing 57 by a horizontally moving guiding mechanism 56, which is part of the means for supporting the receptacles. The receptacles 55 are moved from the working position (FIG. *7a*) in a horizontal plane to the storage position (FIG. *7b*) which is adjacent an upper panel of the housing 57. When in the working position, the receptacles 55 are extended in a fan-like manner such as illustrated in FIG. *7a*. Each of the receptacles 55 is provided with a guide pulley 58 which is mounted on the mechanism 56 to move with the receptacles 55 on sliding guide rods 63, 63 (FIG. 8). The supply hoses 59 after passing over the guide pulleys 58 pass over guide or idler pulleys 60, which are mounted in the housing in a fixed position such as by tabs 65 of a frame 61 of the means for supporting the receptacles. Each of the supply hoses 59 after passing over the fixed idler pulleys 60 passes around another idler pulley 62, which is provided with a weight and then to the connection to a source of supply for the fluids and electricity.

To facilitate moving the receptacles 55 from a withdrawn position to the extended position, the guide mechanism 56, which has a carrier 64 moving on the guide 63 is provided with a handle or hoop 66. It should be noted that the group of secondary handpieces in the second row, which are not illustrated for the purposes of clarity, would be mounted in a row beneath the first row for movement such as the receptacles in the embodiment of FIGS. 1 and 2 or the receptacles of the embodiment of FIG. 6.

Although various minor modifications may be suggested by those versed in the art, it should be understood that I wish to embody within the scope of the patent warranted hereon all such modifications as reasonably and properly come within the scope of my contribution to the art.

I claim:

1. In a mobile dental unit comprising a housing of a tabletop height and having a width, which is less than half the heights, said housing on a narrow side being provided with a plurality of side-by-side storage receptacles for dental handpieces, each of said dental handpieces having a supply hose extending through the receptacle to a supply source with means for taking up the supply hose, the improvements comprising the receptacles for the handpieces being arranged in two separate rows with a first row of receptacles containing receptacles for primary dental handpieces and a second row of receptacles containing receptacles for the secondarily used handpieces, means for supporting each of the rows in the housing for movement relative to each other and for movement of each row between a storage position within the housing to a working position with the receptacles extending from the housing to enable removal of the handpieces from the respective receptacle with the second row being disposed beneath the first row, said means for supporting also supporting a guide pulley for each receptacle of the first row adjacent the receptacle and immediately below the top of the housing, said means for supporting positioning the receptacles in varied relation to each other to improve access to the handpieces received therein, and said means for taking up the supply hoses for the first row of receptacles including means for retracting the supply hoses into the housing when the handpieces are not in use.

2. In a mobile dental unit according to claim 1, wherein the means for supporting the first row of receptacles for primary handpieces enables rotation of the receptacles around a horizontal axis between said storage and working position.

3. In a mobile dental unit according to claim 2, wherein the means for supporting the first row of receptacles includes means enabling adjustment of the receptacles to extend at different angles of inclination with regard to a horizontal plane.

4. In a mobile dental unit according to claim 1, wherein the means for supporting mounts the first row of receptacles for movement around a pivot axis from the working position downward into the housing into the storage position.

5. In a mobile dental unit according to claim 1, wherein the means for supporting the first row provides rotation of the receptacles of the first row between the working position and the storage position and said means for supporting provides a common axle for rotatably supporting the first row of receptacles and associated guide pulleys.

6. In a mobile dental unit according to claim 1, wherein the means for supporting mounts the second row of receptacles for pivoting between the working position and the storage positon with the free ends of the receptacles extending downward.

7. In a mobile dental unit according to claim 1, wherein the means for supporting mounts the second row of receptacles for rotation about an axis from the storage position with the free end of the receptacles extending upward to the working position with the receptacles extending at an angle to a vertical plane.

8. In a mobile dental unit according to claim 1, wherein the means for supporting said rows of receptacles supports each of said rows for movement around separate pivot axes and includes means interconnecting said receptacles.

9. In a mobile dental unit according to claim 8, wherein the means interconnecting the rows causes both rows to move from a storage position to the working position and vice versa.

10. In a mobile dental unit according to claim 9, wherein the means for interconnecting forms a movable partition in said housing.

11. In a mobile dental unit according to claim 1, wherein the receptacles of the first row include a control shelf having means for carrying instrument pieces for the handpieces, said means for supporting mounts the first row of receptacles and control shelf to pivot around a common horizontal axis from the storage position to a working position.

12. In a mobile dental unit according to claim 11, wherein said control shelf acts as a movable partition for separating the receptacles of the first row from the means for taking up the supply hose when in the storage position.

13. In a mobile dental unit according to claim 11, wherein said means for supporting the control shelf and the storage receptacles of the first row utilizes a common horizontal axle.

14. In a mobile dental unit according to claim 1, wherein the housing includes a movable cover, means for mounting the cover for pivotable movement in the housing and including a slide track to enable moving the cover to a storage position adjacent and extending parallel to a top of the housing.

15. In a mobile dental unit according to claim 1, wherein the means for supporting the second row of receptacles includes a tiltable front panel, which moves into a covering position as the second row of receptacles is moved to the storage position.

16. In a mobile dental unit according to claim 1, wherein the means for supporting mounts the first row of receptacles for slidable movement in a horizontal plane from the storage position within the housing to the working position extending out of said housing.

17. In a mobile dental unit according to claim 16, wherein said means for supporting the first row of receptacles supports two guide pulleys for each supply hose, the first of said guide pulleys being immediately adjacent the fixed end of the receptacle and movable therewith relative to the second guide pulley which is mounted for rotation about a fixed axis.

* * * * *